United States Patent [19]

Roseby

[11] 3,760,651
[45] Sept. 25, 1973

[54] GEAR SHIFT LEVER
[75] Inventor: Maurice Roseby, Ann Arbor, Mich.
[73] Assignee: Tamco Limited, Ontario, Canada
[22] Filed: Sept. 22, 1971
[21] Appl. No.: 182,632

Related U.S. Application Data
[63] Continuation-in-part of Ser. No. 877,790, Nov. 18, 1969, abandoned.

[52] U.S. Cl. .................................. 74/523, 74/543
[51] Int. Cl. ............................................. G05g 1/04
[58] Field of Search..................... 74/523, 543, 484, 74/473 R, 473 P; 29/470.3; 280/150 B

[56] References Cited
UNITED STATES PATENTS
2,272,897  2/1942  Riesing ................................. 74/523
3,453,901  7/1969  Houston ........................... 74/543 X Primary Examiner—Milton Kaufman
Assistant Examiner—Frank H. McKenzie, Jr.
Attorney—Stevens, Davis, Miller and Mosher

[57] ABSTRACT

A gear shift lever for mounting on the steering column of an automobile which will bend under a severe impact while having adequate strength for all normal operations. The lever is made by using a length of round steel bar stock to provide a round stem and subsequently inertia welding it to an enlarged end portion which is square in cross-section. The end portion is then machined as is necessary to provide a conventional shape for mounting in the steering column. Thereafter, a plastic sheath of organic plastic material is injection molded onto the stem and over the weld joint to provide a sheath with an enlarged head on the remote end of the stem. The sheath diminishes in wall thickness from the enlarged end portion to the remote end of the stem.

1 Claim, 5 Drawing Figures

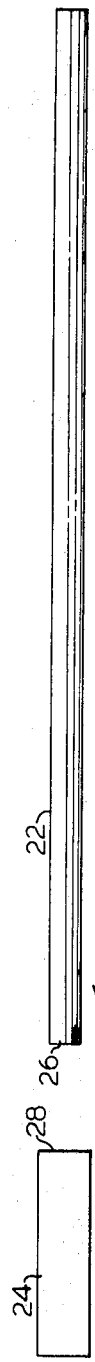
FIG. 2.
FIG. 3.

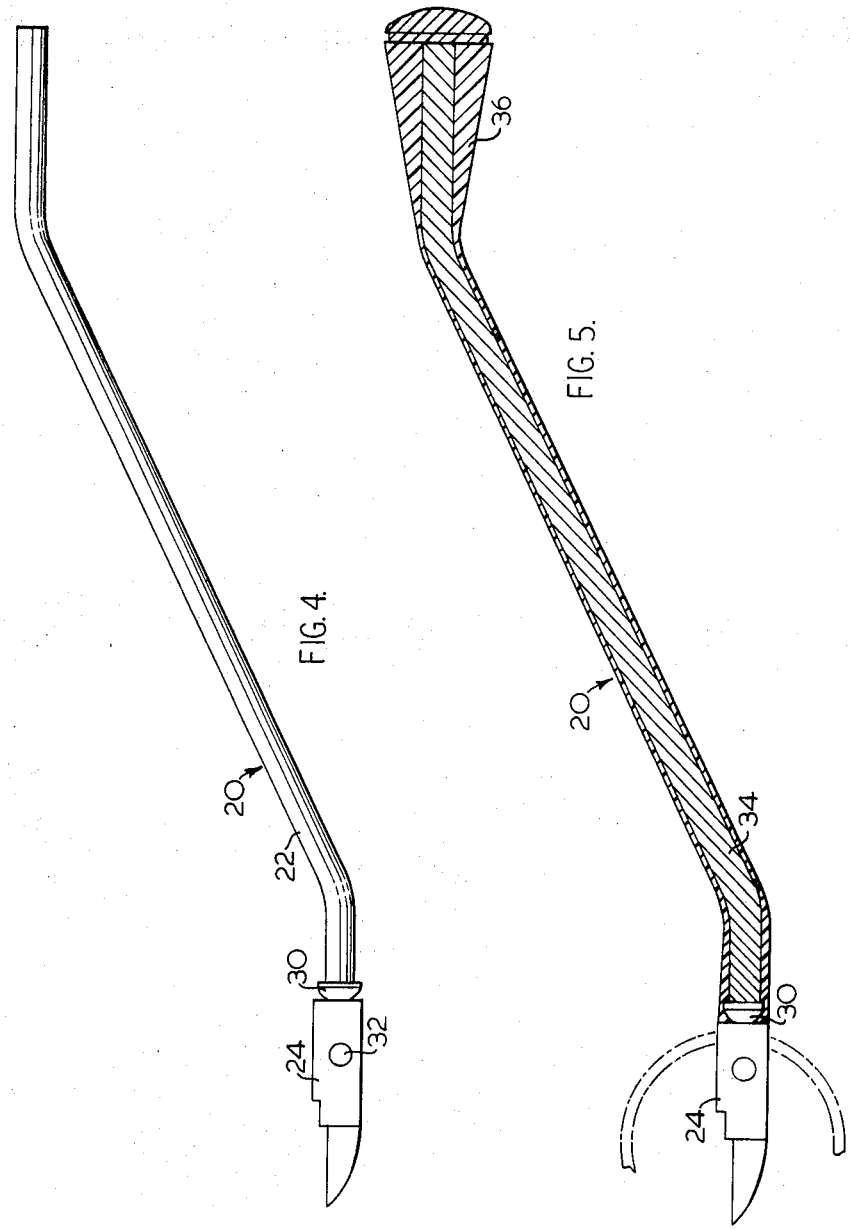

GEAR SHIFT LEVER

The present invention relates to an improved gear shift lever for an automobile and to a method of making the same. This application is a continuation-in-part of application No. 877,790 filed Nov. 18th, 1969, now abandoned.

The normal gear shift lever currently in use is generally made from C12L14 or C1117 steel, of approximately a one-half inch square size at the steering column end, then rounded on leaving the column to a one-half inch round, tapering over an average length of 7 inches to approximately three-eight inch round, capped by a plastic or die cast metal styled knob. Due to the cross sectional area and tensile strength of the steel, this type of lever has considerable strength and bend resistance, and constitutes a danger if a person were thrown against it violently.

Manufacture of such a known lever commences with a blank made of free-machining steel, normally leaded, of one-half inch × one-half inch × 12 inch, which weighs approximately 0.85 lbs.

This blank has 10 inch at one end turned down to a round, tapering away from the 2 inch square end to a shape designed by the automotive stylists, and with a reduced section at the far end which requires a knurled section. This reduced section is so made and knurled to provide a seating for the knob, which has a similar inside diameter to the reduced lever section, allowing the knurls to bite into the inside wall of the knob and prevent movement after the knob is pressed on. At this stage approximately 0.35 lb. has been machined off into scrap. The lever is then ground or polished on the tapered round section to a finish capable of accepting a nickel and chromium plating.

The square end is then drilled for its pivot hole and broached to the required shape for operating the transmission linkage from the automobile steering column, following which it is bent to the form as shown on the blueprint of the customer.

The lever is now heat treated by carburisation to a specified hardness, following which it is sent out for chromium plating and return.

The knob is purchased as a separate item, and the final manufacturing operation is pressing the knob on to the knurled end of the lever to make it into an assembly.

According to the present invention, a gear shift lever is provided having a mounting end portion of generally square cross-section which has been machined to the conventional shape, and a stem is made integral therewith by inertia welding and projects axially from the square end portion. The stem is round in cross-section and has a diameter substantially less than the width of the square cross-section. A sheath of organic plastic material covers the stem as well as the weld joint and defines at the remote end an enlarged knob. The sheath has a progressively lesser wall thickness from its end adjacent to the square end portion to its remote end defining the knob. Thus, the outer configuration of the gear shift lever is substantially the same as the conventional gear shift levers now in use, but is capable of bending after a severe impact without breaking at the weld joint while having adequate strength for all normal operations. If desired, the plastic material can be chromium plated or otherwise treated to satisfy current styling demands. By virtue of this construction and arrangement, on severe impact, the plastic will shatter at its thin section around the round steel rod, remaining whole at the knob end, so that the effect of a severe impact would be that the blow would be spread over a relatively large area at the knob, and the main strain would be transferred to the one-quarter inch steel rod, which will bend under the impact.

According to a preferred method of manufacturing the gear shift lever, the metal portion of the lever would be formed from a one-quarter inch round steel stock or similar and inertia welded to a square end portion.

The method uses two pieces of steel to make the blank, for example, one a 2 inch × one-half inch × one-half inch of free-machining steel and the other, a 10 inch × five-sixteenth five-sixteenths (or thereabouts) round bar, both pieces having a total weight of approximately 0.35 lb.

The two pieces are then hopper fed into an inertia welding machine and automatically welded together to form the completed blank. Welding is done by spinning one piece at high speed in a chuck which acts a flywheel and creates kinetic energy. The spinning piece/chuck assembly is brought in by hydraulic pressure to where the square and round pieces meet under pressure, at which point the power rotating the chuck is cut off and the kinetic energy of the chuck is converted into heat which fuses the two pieces together in a perfect weld.

The fusion causes a ring of a metal upset by a weld to form a flash ring of a diameter more than the round, but less than the square portion. Various tests and sectioning have proved that the welding procedure is complete and 100 percent repeatable, with the weld area stronger than the original round bar section. The blank is now drilled broached and bent to print dimensions and heat treated. It is then placed into a multi-cavity split mold in a plastic injection molding machine where it is covered in a plastic coat from the end of the square section adjacent to the weld to the other end, the outer surface of the plastic taking the shape required by the original styling designer and including as an integral part, the knob. On removal from the mold, the lever assembly is complete. The coating surrounds the upset flash which acts as a lock.

Accordingly, it is an object of the present invention to provide an improved gear shift lever for an automobile, and further, to provide an improved method of manufacturing the same.

Other objects of this invention will appear in the following description and appended claims, reference being had to the accompanying drawings forming a part of this specification wherein like reference characters designate corresponding parts in the several views.

FIG. 2 is a side elevational view the basic components of a gear shift lever embodying the present invention;

FIG. 3 is a side elevation showing how the components are welded together;

FIG. 4 is a side elevation of the lever in fully machined form; and

FIG. 5 is a side elevation of a completed gear shift lever according to the invention.

Figure 1:
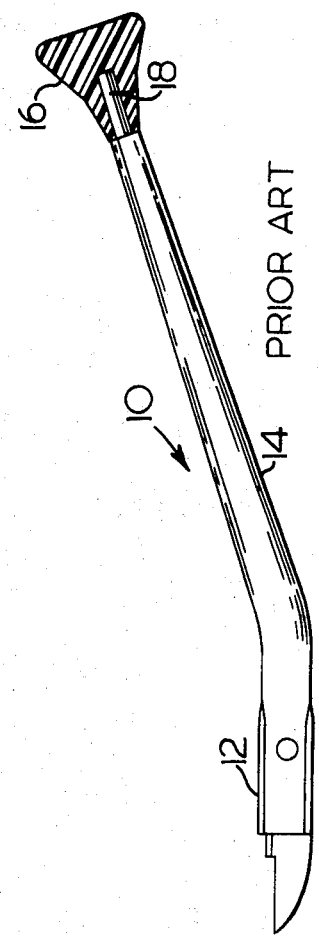
FIG. 1 is a side elevational view of a conventional gear shift lever, with the plastic end portion in section.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings and initially to FIG 1, an embodiment of a conventional gear shift lever 10 is now in use can be seen. The gear shift lever 10 includes a square end portion 12 which has been machined to the desired operational shape for mounting in the steering column (not shown) of an automobile. Normally, the square end portion will measure one-half inch on each side, and forming an integral extension is the round portion 14 which is one-half inch in diameter adjacent to the square end portion 12, tapering to approximately three-eights of an inch adjacent to the plastic knob 16 which caps the end 18 of round portion 14.

The component parts of the improved lever 20 are shown in FIG. 2 and consist of a lever 22 of round section approximately five-sixteenths inch of S.A.E. 1,022 or 1,027 steel. Lever 22 is secured by inertia welding to a column end blank 24.

In a preferred method of manufacture, the blank 24 is secured in position against movement while the lever 22 is placed in a chuck assembly, not shown, and spun at high speed, approximately 10,000 R.P.M. The terminal end 26 of the lever 22 is then advanced in the direction of arrow A, FIG. 2, under pressure of 450 P.S.I. into engagement with the end 28 of the blank 24, at which point the power rotating the chuck assembly is removed.

With an engagement speed of approximately 7,000 R.P.M. under the abovementioned pressure, the kinetic energy of the rotating lever is converted to heat which fuses the two components together as shown in FIG. 3. The fusion of the components effects a ring of metal upset by the weld to a depth of 0.90 inch and 0.125 inch to form a flash ring 30 of a diameter greater than the lever 22 but less than the blank 24.

The blank 24 is then drilled at 32, FIG. 4, and the lever 22 is bent to required shape and then heat treated. The assembly of FIG. 4 is then placed into a split mold of a plastic injection molding machine, not shown, where a plastic sheath 34, FIG. 5, is applied from the blank 24 to the other remote end of the lever where the plastic molding process provides an integral knob 36. It will be noted from FIG. 5 that the plastic sheath 34 envelopes the flash ring 30 to lock the sheath thereon.

In use, the sheath 34 of the gear shift lever 20, on severe impact, would shatter at its thin section adjacent to the knob 36 but would remain whole at the knob 36 so that the effect of a severe impact would be that the blow would be spread over a relatively large area at the knob, and the main strain would be transferred to the stem 22, which would bend under the impact. Thus, the gear shift lever 20 is constructed and arranged to bend under severe impact, while retaining adequate strength for all normal operations, thereby providing greater safety for occupants of the motor vehicle.

The method of manufacture according to the invention reduces the known methods by several steps and has numerous advantages some of which are:

a. the weight of steel for the blank reduced by about 0.5 lb. (over 60 percent) and only the 2 inch section need be the more expensive free-machining type; the stem is straight carbon steel;

b. heat treating is done by weight and the weight of the new type of blank is 30 percent less than the old;

c. there is no grinding, polishing or surface finishing of the stem nor the knurling or reduced end section of known methods; and there are no chips or scrap to remove and no cutting or knurling tools required;

d. no chromeplating, which involves trucking to and from platers and is costly, and occasionally a source of rejection.

I claim:

1. A gear shift lever for an automobile comprising a mounting end portion having a generally square cross-section, a one-piece stem inertia welded to and projecting axially from the square end portion, said stem being round in cross-section and having a diameter substantially less than the width of said square cross-section, a flash ring at the inertia welded junction between said stem and the end portion, and a sheath of organic plastic material covering said flash ring and said stem and extending between said end portion and said flash ring and defining an enlarged knob at the remote end of said stem.

* * * * *